Figure 1:
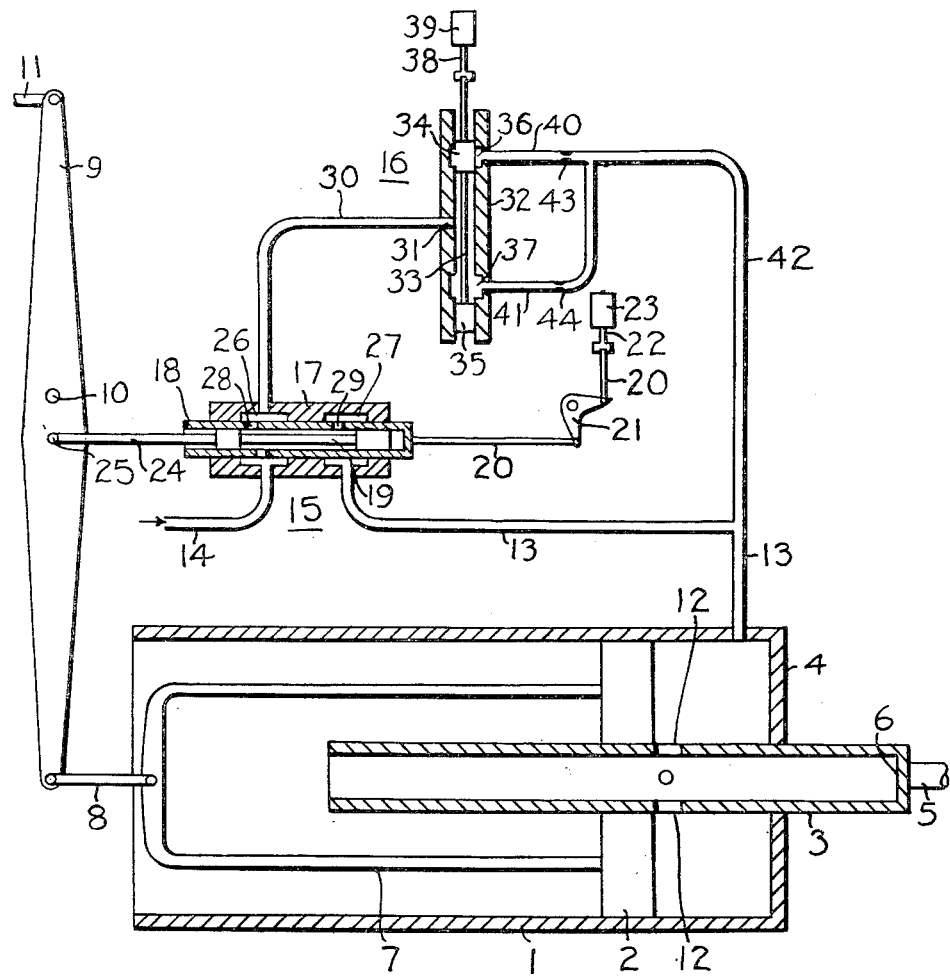

Dec. 11, 1956   L. ABRAM ET AL   2,774,025
ELECTRICALLY OPERATED HOISTS, WINDERS, AND THE LIKE
Filed June 18, 1954   2 Sheets-Sheet 2
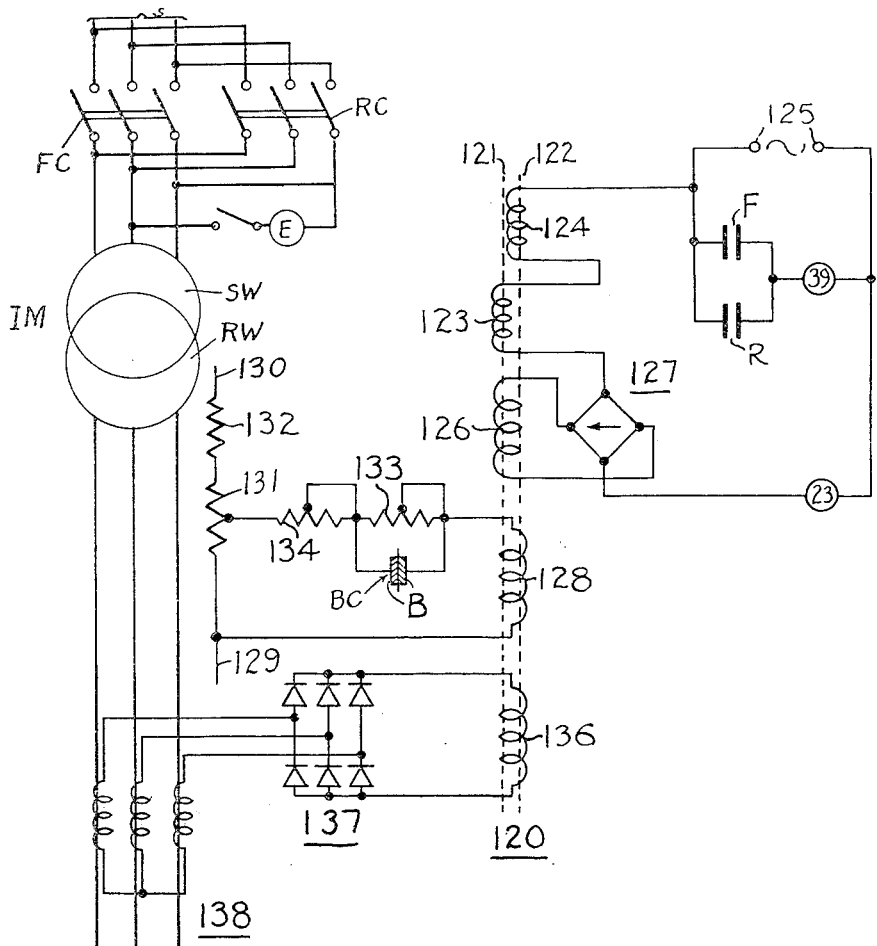
Fig.2
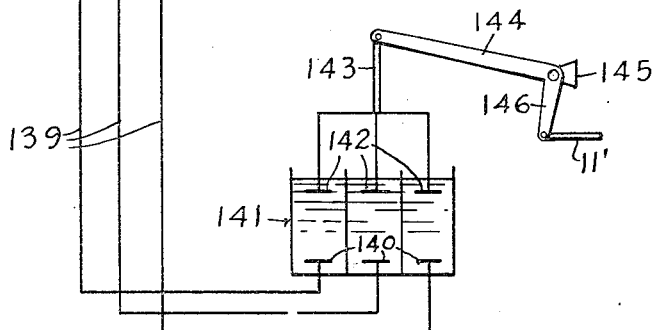
INVENTORS
Leo Abram
Richard Hathaway
By Marris & Bateman
ATTORNEYS United States Patent Office 2,774,025
Patented Dec. 11, 1956

2,774,025

ELECTRICALLY OPERATED HOISTS, WINDERS, AND THE LIKE

Leo Abram, Sale, and Richard Hathaway, Swinton, England, assignors to Metropolitan-Vickers Electrical Company Limited, London, England, a British company Application June 18, 1954, Serial No. 437,784

7 Claims. (Cl. 318—241)

This invention relates to electric winders, hoists and the like, in which a slip-ring induction motor is controlled by a resistance adjustable by a fluid-pressure servo system, preferably of "follow-up" or "corresponding" type, from a driver's lever or other control member. The resistance usually comprises a liquid resistance adjustable by variation of the distance between fixed and moving electrodes. The resistance controls the torque of the motor when driving the winding drum and is also frequently employed as a loading resistance during dynamic braking.

The resistance is manually controllable by the driver's lever, the servo system being employed to reduce the effort required by the driver. The maximum value of the resistance must be sufficient to provide satisfactory operation at reduced loads and reduced speeds, and is usually adjusted by variation of the electrolyte strength so as to give, for example, a torque approximately equal to 33% of the full load torque at 20% of full speed. For the normal winding cycle, however, a torque of the order of 150% to 200% of full load torque is required in order to provide the acceleration desired. For this purpose, the rotor resistance required at the start of the wind is somewhat smaller than the maximum value. It is necessary to attain the smaller value of resistance above referred to as rapidly as possible after a wind is initiated; thereafter the torque is required to be maintained at an approximately constant value until the full speed is attained, the resistance being reduced to the minimum value in the designed accelerating period.

By the use of a fluid pressure servo system it is possible on initiating a wind for the driver to actuate his lever rapidly to the full speed position, the rate of response of the servo system being such that the rotor resistance will be reduced at an appropriate rate for the designed winding cycle. It will be apparent from the above description that when the driver's lever is so actuated, the servo system is required to move the electrodes at a rapid rate over the first part of the electrode travel and at a reduced rate over the remainder of said travel. For this purpose the common practice heretofore has been to provide, in the servo system, valve means located between the fluid pressure pump and the servo motor, so as to reduce the rate of flow of fluid into the servomotor under control of the position of the electrodes by a mechanical linkage to said valve means. Since the pump will still be delivering the full quantity of oil at the full pressure, a relief valve is provided on the pump side of the valve means so as to open when the pressure rises in response to the partial closure of said valve means.

Alternatively, as is described in application for Letters Patent No. 19,932 of 1952, bypass valve means may be provided for reducing the pressure applied to the piston of the servomotor when the rate of movement of the piston is to be reduced. By this means, the pressure produced by the pump during the slow rate of movement of the electrodes is reduced so that with the pump still delivering at the same rate, the work output of the pump is reduced and the efficiency of the system is thus increased. As is also described in said application, the bypass valve means may be actuated mechanically in dependence on the electrode position correspondingly with the arrangements first above referred to, but preferably are provided with operating means responsive to the motor current. By this means, the torque at which the slow rate electrode movement is introduced is independent of variations in electrolyte strength and temperature. Similarly the flow-reducing valve means provided according to the common practice as first above described may alternatively be operated by said current-responsive means. The operating means referred to may be arranged to respond to different motor currents during motoring and dynamic braking and for this purpose two valves may be employed providing separate bypass passages from the servomotor or fluid flow constriction between the pump and the motor; these valves are normally closed but are opened respectively by solenoids or other means included in electric circuit arrangements responsive to the motor current during motoring and braking conditions respectively. By this means the slow rates of movement may be different during motoring and braking and may be selected independently of one another.

According to the present invention in an electric winder, hoist or the like equipment of the kind referred to, with or without provision for dynamic braking, valve means for introducing a reduced rate of movement of the servomotor in response to a predetermined value of motor current are employed in conjunction with means responsive to the position of the electrodes for reducing the rate of movement of the servomotor when the latter reaches a predetermined position, independently of the motor current, whereby to provide protection against high transient torques when the resistance is reduced to values near the short circuit value. For example, said means may operate to introduce the slow rate of movement of the servomotor when the electrodes have moved through 95% of the total travel thereof from the maximum resistance position. This arrangement will also protect the electrodes from mechanical damage which might otherwise occur if the electrodes were brough to rest by mechanical stops when moving at the high rate of travel. The current responsive valve means may be employed in combination with valve means operated mechanically in accordance with the position of the output member of the servomotor and thus of the electrodes, so that the introduction of the slow rate of travel is under the joint control of the current responsive means and the position of the servomotor in the manner hereinbefore set forth. In such combined arrangements of the valve means, the latter may conveniently comprise cooperating valve members coupled respectively with means responsive to the motor current and with the output member of the servomotor. Conveniently said valve means may comprise a piston valve working within a ported sleeve, the piston valve being coupled with the electrodes and the sleeve with the current responsive means, or vice versa, said ports being so positioned relative to the piston valve at any time as to be closed when the electrodes reach the predetermined position or when the current reaches the predetermined value.

The valve means referred to may be employed in conjunction with a transfer valve arranged to render one or the other of two flow restricting orifices effective to control the slow rate of movement of the piston, according as the motor is being operated under motoring or dynamic braking conditions.

One embodiment of the invention will now be described by way of example with reference to the accompanying drawings, in which:

Fig. 1 shows diagrammatically the arrangement of the servomotor and valve means, therefor, and Fig. 2 is an electrical diagram showing a suitable electrical circuit arrangement for the operation of the valves in Fig. 1.

In the example illustrated, the servomotor is of the type comprising a cylinder 1 and piston 2 with a ported sleeve 3 slidably extending in fluid type manner through the piston 2 and end 4 of the cylinder 1. The sleeve 3 is coupled mechanically with the driver's lever (not shown) by any suitable linkage between said lever and a rod 5 formed with or secured to the closed end 6 of the sleeve.

The piston 2 is connected with the moving electrodes of the liquid resistance (not shown) such as by means of a forked piston rod 7, connecting rod 8, rocking lever 9 pivoted at 10, and a link one end of which appears at 11. The piston 2, said moving electrodes, and the linkage therebetween are biased by gravity or springs to the maximum resistance position wherein the piston 2 is fully retracted within the cylinder 1. The ports of the sleeve are shown at 12 and are so positioned that when the driver's lever is in the "off" position the sleeve will be so positioned, as shown in the drawing, that the ports 12 are located between the end 4 of the cylinder and the pressure face of the piston. Pressure oil is supplied by means hereinafter to be described to the cylinder by means of a conduit 13. In the illustrated "off" position of the sleeve 3 and illustrated maximum resistance position of the piston 2 the oil supplied under pressure to the cylinder 1 is thus allowed to pass freely through the ports 12 and is discharged from the open left-hand end of the sleeve and the open end of the cylinder 1 to a sump (not shown) from which the oil is returned to the inlet side of the pump providing the operating pressure, in the well known manner. Displacement of the driver's lever moving the sleeve 3 to the left-hand in the drawing will cause the ports 12 to pass beyond the pressure face of the piston so that the discharge path for the oil is closed and the oil pressure will build up within the cylinder to move the piston outwardly until the latter again moves to the left of the ports. The piston is thus displaced by the same distance as the sleeve 3 so that the displacement of the moving electrodes is proportional to the displacement of the driver's lever.

It will be clear that the rate at which the piston moves in following the movements of the sleeve will depend on the rate at which the oil flows into the cylinder. Furthermore, the oil pressure necessary to overcome the inertia of the moving electrodes and other parts increases with the required speed of response of the servo system.

In the embodiment of the invention shown in the drawing, the inlet conduit 13 is connected with an oil delivery pipe 14 by valve means now to be described. It will be understood that the delivery conduit 14 is connected with the outlet of the oil pressure pump and the latter will have associated therewith the usual relief valve maintaining a predetermined oil pressure in the conduit 14. The valve means comprises a control valve 15 and a transfer valve 16, which latter however may be omitted in some applications. The control valve comprises a valve chest 17 housing an axially slidable valve sleeve 18 which in turn houses a piston valve 19. The sleeve 18 is connected such as by links 20 and a bell-crank lever 21 with the plunger 22 of a solenoid 23 which is connected for energisation under control of a current responsive electromagnetic relay or transductor (magnetic amplifier) in dependence on the rotor or stator current of the motor. The piston valve 19 is connected by a link 24 with an intermediate point 25 of the rocking lever 9 so as to be moved proportionally to the movement of the piston 2.

The valve chest 17 comprises a pair of valve chambers 26 and 27, the delivery conduit 14 being connected with the chamber 26 and the chamber 27 being connected with the inlet conduit 13 for the servomotor. The sleeve 18 is provided with ports 28 and 29 whereby in the illustrated positions of the various parts the pressure oil from the conduit 14 is permitted to flow freely through the chamber 26, port 28, sleeve 18, port 29, and chamber 27 to the conduit 13 and thereby to the cylinder 1.

The valve chamber 28 is connected by means of a conduit 30 with an inlet port 31 of the transfer valve. This valve comprises a valve chest 32 and balanced piston valve 33 having lands 34 and 35, the land 34 obstructing the flow of oil through an outlet port 36 in the illustrated position of the valve, whilst oil is permitted to flow through an outlet port 37. The valve 33 is connected with the plunger 38 of a solenoid 39 which is connected in an electric circuit so as to be energised when the control means for the winder establish motoring operation. When the solenoid is so energised the valve 33 is lifted so that the land 35 obstructs the outlet port 37 whereas the port 36 is opened.

The ports 36 and 37 are connected by conduits 40 and 41 with a conduit 42 and thereby with the inlet conduit 13 for the servomotor. The conduits 40 and 41 include restricted orifices 43 and 44 respectively.

In the operation of this arrangement, during braking conditions when the driver's lever is moved to reduce the rotor resistance, then, the sleeve 18 and valve 19 being in the illustrated positions the servomotor will initially move at the higher rate, but when the motor current reaches the predetermined value at which the solenoid 23 is energized the solenoid will move its plunger 22 downwardly so as to actuate the sleeve 18 to the left and thereby move the ports 28 and 29 out of the chambers 26 and 27. The direct flow of oil from conduit 14 to conduit 13 by way of the transfer valve is then prevented; the pressure oil then flows to the cylinder only through the conduit 30, transfer valve 16 and conduit 42. The solenoid 39 being de-energized during the dynamic braking, the valve port 37 is opened whereas the port 36 is closed so that the rate at which the oil flows to the cylinder 1 is determined by the orifice 44. This orifice is proportioned so as to provide a rate of movement of the piston 2 which will reduce the rate of movement of the electrodes of the liquid resistance to the value giving the required retardation of the winder.

When the piston 2 reaches a predetermined position for example corresponding with 95% of the total travel of the electrodes, then irrespectively of the position of the sleeve 18, which may have returned to the illustrated position if the motor current falls below the predetermined value, the piston valve 19 is operated by the link 24 so as to cover the port 29 and again restrict the rate of movement of the electrodes to the lower value. By this means excessive breaking torques and terminal speeds of the electrodes are prevented.

The operation during motoring conditions is similar to that above described, except that the transfer valve solenoid 39 is energized so as to introduce the orifice 36 into the pressure flow to the cylinder 1 and so limit the speed of the electrodes to a predetermined different value appropriate to motoring conditions.

The current setting of the control valve 15 may conveniently be changed as between motor and braking conditions by auxiliary contacts operated in response to contactors which established the motor conditions for forward and reverse motoring, on the one hand, and dynamic braking, on the other hand.

In the electrical control arrangement shown in Fig 2, a transductor 120 is employed and is shown by way of example as being of the known type comprising two magnetic cores represented diagrammatically by the broken lines 121 and 122 having linked respectively therewith output windings 123 and 124, which may be connected in series with one another as shown, or in parallel with one another, said windings being connected in series in an alternating current circuit energized from an alternating current supply at 125 and including the solenoid 23. The solenoid 39 is energized directly from the supply 125 in a circuit including, in series with said solenoid, parallel connected interlock contacts F and R of the usual forward and reverse contactors FC and FR for connecting a stator winding SW of the motor IM with the supply conductors S. The rotor winding RW of the motor is connected with fixed electrodes 140 of a liquid rheostat 141, moving electrodes 142 of which are connected by a link 143 with one arm 144 of a bell crank lever pivoted at 145 and the other arm 146 of which is connected with one end 11' of the link 11 appearing in Fig. 1. The main circuits of the motor and the control means therefor may follow the usual practice and further description thereof is deemed unnecessary herein. It will be understood that the interlock contacts F and R are normally open and are closed when the main contactors respond to operation of the driver's control lever or other means employed for the selection of the operating conditions.

The transductor includes a positive feedback winding 126 linking both cores 121 and 122 and energised by means of a rectifier 127 included in series in the output circuit.

A biasing winding 128 linking both cores 121 and 122 is energised from a constant voltage source of auxiliary direct current at 129, 130, by means of potential dividing resistors 131 and 132 if necessary, and a pair of preset resistances 133 and 134 in series with one another and the winding 128. The resistor 133 is shunted by normally closed contacts B of the usual contactor BC whereby excitation current is supplied such as from exciter E to the stator winding when dynamic braking circuits are established, this contactor also forming part of the control means above referred to and being again arranged in accordance with the usual practice.

A control winding 136 linking both cores 121 and 122 is connected by means of a rectifier 137 and current transformers 138 in the rotor conductors 139 of the motor.

The feedback winding 126 acts in opposition to the biasing winding 128, so that in the absence of motor current the output current of the transductor is small and is less than the value necessary to energise the solenoid 23.

During motoring, the solenoid 39 is energised, by closure of the interlock contacts F or R according to the direction of wind so that the transfer valve 16 is lifted in Fig. 1 to open the port 36 and close the port 37. The winding 136 is energised in accordance with the motoring current. The current in the output winding will be insufficient to cause the solenoid 23 to operate the valve 15 until the motoring current exceeds a predetermined value such that the winding 136, which acts in opposition to the winding 128, overcomes the effect of the latter. This value is determined by adjustment of resistor 134. When this predetermined value of motor current is exceeded the output current of the transductor increases sufficiently to cause the solenoid 23 to open the valve 15 so that liquid is bypassed from the cylinder 1 and the rate of movement of electrodes reduced as hereinbefore indicated.

During braking, since the forward and reverse contactors are open, the interlock contacts F and R are also open so that the solenoid 39 is de-energised and the valve 16 closes port 36 and opens port 37. Further, during braking, the preset resistance 133 is also inserted in series with the winding 128, due to the opening of the auxiliary contacts B2 of the braking contactor, so that current in the biasing winding 128 is reduced, and therefore the winding 128 can be counterbalanced by the winding 136 at a lower value of motor current. Consequently the solenoid 23 will be energized to open the valve 15 at a lower value of motor current and thereby reduce the rate of electrode travel.

It will be understood that in place of the transfer valve 16 being biased to the braking position as above described, said valve may be biased to the motoring position, opening port 36 and being operated to the braking position, closing port 36 and opening port 37 by energisation of the solenoid 39, the control circuit of the latter being appropriately modified to include interlock contacts of the forward and reverse contactors. With the arrangement as first described however, the solenoid operated valves are energised to the slow rate of travel so that failure of the valves to operate will cause the electrodes to travel at the higher rate throughout the movement of the electrodes. In the event of failure of the valves to operate, then in response to rapid movement of the control lever the motor torque will build up quickly on both power and braking conditions, whereas in the alternative arrangement wherein the valves are energised to the higher rate of travel, failure of the valves will result in movement of the electrodes at the slow rate throughout the stroke, with consequent slow build up of torque. For this reason the arrangement of the valves energised to slow rate of travel is preferred.

It will be understood that arrangements according to the invention employing joint control of the rate of travel by the motor current and the electrode position may be applied also in the arrangements wherein the valve is arranged to bypass pressure oil from the cylinder, as described per se in application No. 19,932 of 1952 aforesaid instead of introducing restrictions into the supply of pressure oil to the cylinder. The re-arrangement of the valve and pipe connections for this purpose will be clear to those skilled in the art.

It will be understood that the arrangements described are equally applicable to other forms of servo system, for example of the type in which the flow of oil to the piston is controlled by a pilot valve having a follow-up linkage with the driver's lever and the piston.

What we claim is:

1. An electric winder equipment comprising a slip-ring induction motor, a resistance controlling said motor, a fluid pressure servomotor coupled mechanically with said resistance for adjusting the value of said resistance, a control valve and a control member connected thereto for governing the fluid pressure applied to said servomotor, valve means movable between a normal condition applying normal fluid pressure to said servomotor and effecting maximum rate of movement of said servomotor to reduce said resistance and a second condition applying reduced fluid pressure to said servomotor and effecting a reduced rate of movement of said servomotor to reduce said resistance, electro-magnetic operating means coupled with said valve means and responsive to motor current to actuate said valve means from said normal condition to said second condition in response to the motor current reaching a predetermined value, and operating means for said valve means coupled with said servomotor and actuating said valve means from said normal condition to said second condition when the servomotor is actuated to a position near the minimum resistance position to thereby apply said reduced rate of movement of the resistance independently of the motor current during movement of the resistance from said position to the minimum resistance position.

2. An electric winder equipment comprising a slip-ring induction motor, a resistance controlling said motor, a fluid pressure servomotor coupled mechanically with said resistance for adjusting the value of said resistance, a control valve and a control member connected thereto for governing the fluid pressure applied to said servomotor, valve means comprising co-operating valve members each movable between a normal position applying normal fluid pressure to said servomotor and effecting maximum rate of movement of said servomotor to reduce said resistance and a second position applying reduced fluid pressure to said servomotor and effecting a reduced rate of movement of said servomotor to reduce said resistance, electromagnetic operating means coupled with one of said valve members and responsive to motor current to actuate said valve member from said normal position to said second position in response to the motor current reaching a predetermined value and operating means for the other of said valve members coupled with said servomotor and actuating said other valve member from said normal position to said second position when the servomotor is actuated to a position near the minimum resistance position to thereby apply said reduced rate of movement of the resistance independently of the motor current during movement of the resistance from said position to the minimum resistance position.

3. An electric winder equipment comprising a slip-ring induction motor, a resistance controlling said motor, a fluid pressure servomotor coupled mechanically with said resistance for adjusting the value of said resistance, a control member connected with a control valve governing the fluid pressure applied to said servomotor, co-operating valve members comprising a ported sleeve and a piston valve movable within said sleeve, said sleeve and said piston valve being each movable between first and second positions in which said ports are opened and closed respectively, said valve means being connected in the fluid pressure system of the servomotor so as to apply normal fluid pressure to the servomotor and effect maximum rate of movement of said servomotor to reduce said resistance when said sleeve and said piston valve each occupy a predetermined one of said positions thereof, and to apply reduced fluid pressure to the servomotor and effect reduced rate of movement of the servomotor to reduce said resistance when either of said valve members occupies the other of said positions, electro-magnetic operating means coupled with one of said valve members and responsive to motor current to actuate said valve member from said predetermined position thereof to said other position in response to the motor current reaching a predetermined value, and operating means for the other of said valve members coupled with the servo motor and actuating said other valve member from said predetermined position thereof to said other position when the servo motor is actuated to a position near the minimum resistance position to thereby apply said reduced rate of movement of the resistance independently of the motor current during movement of the resistance from said position to the minimum resistance position.

4. An electric winder equipment comprising a slip-ring induction motor, a resistance controlling said motor, a fluid pressure servomotor coupled mechanically with said resistance for adjusting the value of said resistance, a control valve and a control member connected thereto for governing the fluid pressure applied to the servomotor, valve means movable between a normal condition applying normal fluid pressure to the servomotor and effecting maximum rate of movement of the servomotor to reduce said resistance and a second condition applying reduced fluid pressure to the servomotor and effecting a reduced rate of movement of the servomotor to reduce said resistance, electro-magnetic operating means coupled with said valve means and responsive to motor current to actuate said valve means from said normal condition to said second condition in response to the motor current reaching a predetermined value, operating means for said valve means coupled with the servomotor and actuating said valve means from said normal condition to said second condition when the servomotor is actuated to a position near the minimum resistance position to thereby apply said reduced rate of movement of the resistance independently of the motor current during movement of the resistance from said position to the minimum resistance position, two flow restricting orifices each in series with said valve means in the fluid pressure circuit of the servomotor, transfer valves allowing flow of said fluid alternatively through said orifices in respective positions of said transfer valve means, and actuating means for said transfer valve means responsive to the establishment of motoring or braking conditions of said induction motor.

5. An electric winder, hoist or like equipment as defined in claim 4, in which said transfer valve means are biased to one position for rendering one of the orifices effective and are provided with electro-magnetic actuating means connected in an electrical circuit responsive to the establishment of motoring or braking conditions.

6. An electric winder equipment comprising a slip-ring induction motor, a resistance controlling said motor, a fluid pressure servomotor coupled mechanically with said resistance for adjusting the value of said resistance, a control valve and a control member connected thereto for governing the fluid pressure applied to the servomotor, valve means connected in the fluid system between the servomotor and the source of fluid pressure, said valve means being movable between an open condition applying normal fluid pressure to the servomotor and effecting maximum rate of movement of said servomotor to reduce said resistance and a closed condition applying reduced fluid pressure to the servo motor and effecting a reduced rate of movement of the servomotor to reduce said resistance, electro-magnetic operating means coupled with said valve means and responsive to motor current to close said valve means in response to the motor current reaching a predetermined value, and operating means for said valve means coupled with the servo motor and closing said valve means when the servo motor is actuated to a position near the minimum resistance position to thereby apply said reduced rate of movement of the resistance independently of the motor current during movement of the resistance from said position to the minimum resistance position.

7. An electric winder equipment comprising a slip-ring induction motor, a resistance controlling said motor, a fluid pressure servomotor coupled mechanically with said resistance for adjusting the value of said resistance, a control valve and a control member connected thereto for governing the fluid pressure applied to the servo motor, co-operating valve members comprising a ported sleeve and a piston valve movable within said sleeve, said sleeve and said piston valve being each movable between first and second positions in which said ports are opened and closed respectively, said valve means being connected in the fluid pressure system of the servo motor so as to apply normal fluid pressure to the servo motor and effect maximum rate of movement of the servo motor to reduce said resistance when said sleeve and said piston valve each occupy a predetermined one of said positions thereof, and to apply reduced fluid pressure to the servomotor and effect a reduced rate of movement of the servomotor to reduce said resistance when either of said valve members occupies the other of said positions, electro-magnetic operating means coupled with one of said valve members and responsive to motor current to actuate said valve members from said predetermined position thereof to the other position in response to motor current reaching a predetermined value, operating means for the other of said valve members coupled with the servomotor and actuating said other valve member from said predetermined position thereof to said other position when the servomotor is actuated to a position near the minimum resistance position to thereby apply said reduced rate of movement of the resistance independently of the motor current during movement of the resistance from said position to the minimum resistance position, two flow restricting orifices each in series with said valve means in the fluid pressure circuit of the servomotor, transfer valves allowing flow of said fluid alternatively through said orifices in respective positions of said transfer valves, and actuating means for said transfer valves responsive to the establishment of motoring or braking conditions of said induction motor.

References Cited in the file of this patent

UNITED STATES PATENTS 2,689,023   Mulligan et al. _____ Sept. 14, 1954